S. D. GILSON.
Manufacture of Fuel.
No. 57,890.
Patented Sept. 11, 1866.
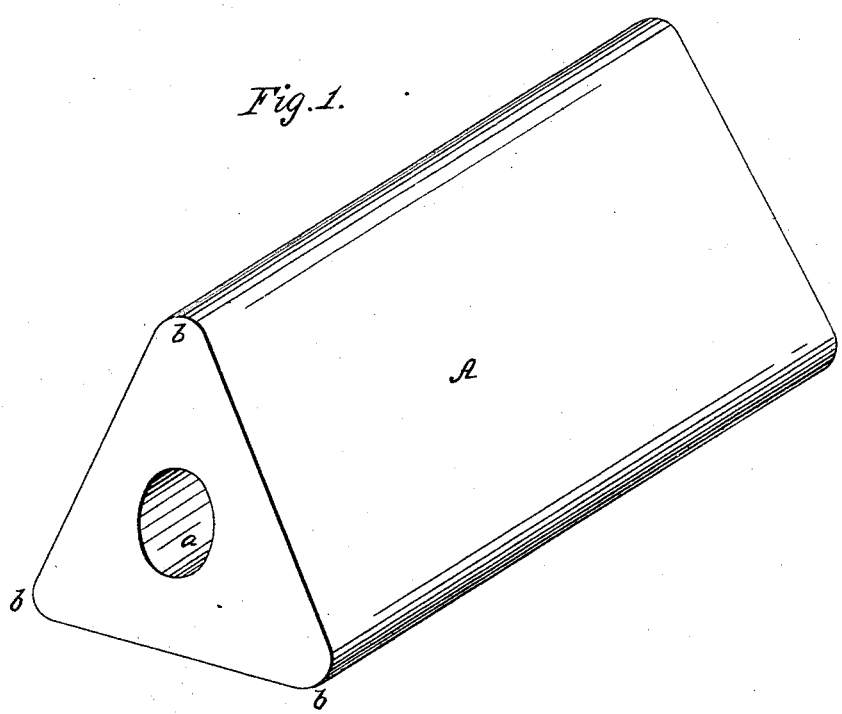
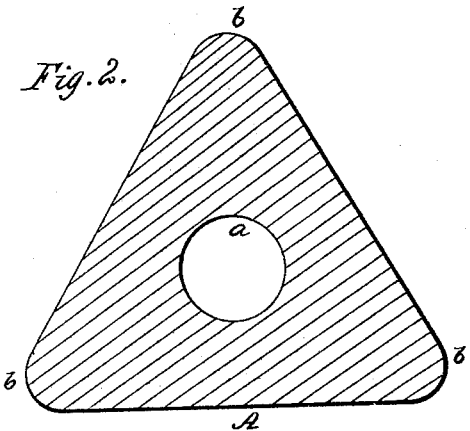
Witnesses:
J. W. Coombs
G. W. Reed.
Inventor:
S. D. Gilson
per his Attys
Brown, Coombs & Co.

UNITED STATES PATENT OFFICE.

SAMUEL D. GILSON, OF OSWEGO FALLS, NEW YORK.

IMPROVEMENT IN THE MANUFACTURE OF ARTIFICIAL FUEL.

Specification forming part of Letters Patent No. 57,890, dated September 11, 1866.

*To all whom it may concern:*

Be it known that I, SAMUEL D. GILSON, of Oswego Falls, in the county of Oswego and State of New York, have invented or discovered a certain useful Improvement in Fuel made from peat, or peat and other substances combined, the same constituting a new article of manufacture, of which the following is a full, clear, and exact description, reference being had to the accompanying drawings, which form part of this specification, and in which—

Figure 1 represents a view, in perspective, of a block of my improved fuel; and Fig. 2, a transverse section thereof, like letters indicating corresponding parts in both figures.

In the manufacture of composition, or, as it has been termed, "artificial" fuel, various plastic and inflammable substances have been used, both separately and in combination, the same having been formed into blocks, and subsequently dried for use. These remarks are equally applicable to peat as a prepared fuel; but there are peculiarities about that substance in its raw or natural state which render its formation into blocks a matter for consideration not altogether requisite in the use of many other substances, simple or compound.

Peat requires to be well dried before using, and even after having been dried is, from the peculiarity of its nature, very liable to absorb moisture. I consequently—and herein my improvement consists—manufacture the peat either by itself or admixed with other substances, but if the latter, having peat for the basis, into blocks of a three-sided form, with one or more openings in or through each block, so as to give it a hollow character. Thus I first take the peat in its raw or natural state and masticate or grind it in a mill either then or subsequently, if it be desired to mix with it tar, refuse, or other inflammable ingredients, mixing with and kneading into it the foreign matter it is intended to associate with it. I then take the mass of ground or prepared peat and press it in molds of a three-sided form, and having fitted in them a mandrel or mandrels, round which the peat is formed into hollow blocks of the shape of the mold. This may be done by machinery similar to that used in brick-making, first employing a pug-mill to masticate the peat, and afterward filling a series of molds with it in succession, said molds being fitted with a mandrel or core to make the blocks hollow, or with a passage-way through them—as, for instance, illustrated in the accompanying drawings, wherein A is a three-sided prepared block of peat having an aperture, *a*, longitudinally through it.

There may, however, be many other modes of manufacturing the peat into prepared or pressed blocks, as also various modes of drying the latter; but the description here given will suffice to explain how this, my improvement, may be carried into effect in a simple and efficient manner.

The drying, it may be stated, may be accomplished by steam or otherwise while the blocks are in the molds. Thus surrounding the molds by jackets and making the mandrels hollow, and introducing steam within the two latter to dry the blocks externally and internally, may be adopted; or the blocks may be dried after they are taken from the molds.

Here, however, it should be observed that making the blocks hollow, or with a passage-way through them, not only facilitates the drying of the blocks made of such spongy, humid, and absorbent material as peat, in the course of their manufacture, and provides a free escape for the water expelled from them when under pressure, but also renders their after-drying, if reabsorbing moisture, more easily accomplished; and, furthermore, said hollow character or passage through them improves the blocks as fuel, by the passage-way constituting a draft for the fire through them, and providing for a more copious supply of oxygen.

By making the blocks three-sided, they may be almost, if not quite, as readily packed in a close compass as if they were square, while the longitudinal edges *b*, which, though rounded, as seen in the drawings, are to some extent liable to chip and crumble, are reduced to three, and hence loss from this cause is made less.

What I claim herein as new and useful, and desire to secure by Letters Patent, is—

The new article of manufacture herein described, constituting fuel made from peat, or peat and other substances combined, in hollow or serrated triangular form, essentially as specified.

S. D. GILSON.

Witnesses:
ALEXANDER DAVIDSON,
SOLOMON H. DAVIDSON.